(12) United States Patent
Venkatesan et al.

(10) Patent No.: US 9,473,899 B2
(45) Date of Patent: Oct. 18, 2016

(54) DEVICE, SYSTEM AND METHOD OF DETERMINING WHETHER A MOBILE DEVICE IS LOCATED IN AN INDOOR LOCATION OR AN OUTDOOR LOCATION

(71) Applicant: INTEL IP CORPORATION, Santa Clara, CA (US)

(72) Inventors: Ganesh (Gany) Venkatesan, Hillsboro, OR (US); Eldad Perahia, Portland, OR (US); Thomas J. (Tom) Kenney, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,302

(22) PCT Filed: May 30, 2013

(86) PCT No.: PCT/US2013/043221
§ 371 (c)(1),
(2) Date: Dec. 26, 2013

(87) PCT Pub. No.: WO2014/193373
PCT Pub. Date: Dec. 4, 2014

(65) Prior Publication Data
US 2015/0172870 A1    Jun. 18, 2015

(51) Int. Cl.
*H04W 24/00* (2009.01)
*H04W 4/04* (2009.01)
*G01S 13/06* (2006.01)
(Continued)

(52) U.S. Cl.
CPC ............... *H04W 4/04* (2013.01); *G01S 13/06* (2013.01); *H04W 4/025* (2013.01); *H04W 64/00* (2013.01)

(58) Field of Classification Search
CPC ......... G01N 2291/044; H04W 64/00; H04W 48/04; H04W 36/30
See application file for complete search history.

(56) References Cited

U.S. PATENT DOCUMENTS

| | | | | |
|---|---|---|---|---|
| 4,290,043 | A * | 9/1981 | Kaplan | 340/984 |
| 7,936,714 | B1 * | 5/2011 | Karr et al. | 370/329 |
| 8,842,496 | B2 * | 9/2014 | Vartanian | G01S 15/08 367/128 |

(Continued)

FOREIGN PATENT DOCUMENTS

| | | |
|---|---|---|
| CN | 101133343 | 2/2008 |
| JP | 2003283509 | 10/2003 |

(Continued)

OTHER PUBLICATIONS

International Search Report and Written Opinion for PCT Patent Application No. PCT/US2013/043221, mailed on Feb. 26, 2014, 13 pages.

(Continued)

*Primary Examiner* — Shantell L Heiber
(74) *Attorney, Agent, or Firm* — Shichrur & Co.

(57) ABSTRACT

Some demonstrative embodiments include devices, systems and/or methods of determining whether a mobile device is located in an indoor location or an outdoor location. For example, an apparatus may include a controller to control a mobile device to transmit a wireless transmission and to listen for one or more received echoes of the wireless transmission received from one or more directions. The controller may determine whether the mobile device is located in an indoor location or an outdoor location, for example, based on the received echoes.

25 Claims, 6 Drawing Sheets

(51) Int. Cl.
*H04W 4/02* (2009.01)
*H04W 64/00* (2009.01)

(56) References Cited

U.S. PATENT DOCUMENTS

| | | | | |
|---|---|---|---|---|
| 2004/0102221 | A1* | 5/2004 | Shirosaka et al. | 455/562.1 |
| 2004/0155795 | A1* | 8/2004 | Quintana | 340/902 |
| 2004/0204026 | A1* | 10/2004 | Steer et al. | 455/550.1 |
| 2007/0099668 | A1 | 5/2007 | Sadri et al. | |
| 2009/0291641 | A1 | 11/2009 | Sato et al. | |
| 2010/0289620 | A1* | 11/2010 | Aminger et al. | 340/10.1 |
| 2012/0327870 | A1* | 12/2012 | Grandhi et al. | 370/329 |
| 2013/0100774 | A1* | 4/2013 | Brown | G01S 15/931 367/99 |
| 2013/0237245 | A1* | 9/2013 | Tinnakornsrisuphap et al. | 455/456.1 |
| 2013/0275873 | A1* | 10/2013 | Shaw et al. | 715/716 |

FOREIGN PATENT DOCUMENTS

| | | |
|---|---|---|
| JP | 2009168516 | 7/2009 |
| JP | 2009281927 | 12/2009 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

International Preliminary Report on Patentability for International Patent Application No. PCT/US2013/043221, mailed on Dec. 10, 2015, 8 pages.

Office Action for Chinese Patent Application No. 201380033457.6 mailed on Jan. 6, 2016, 19 pages (including 12 pages of English translation).

Office Action for Chinese Patent Application Serial No. 201380033457.6, mailed on Jul. 8, 2016, 12 pages (Including 7 pages of English translation.).

\* cited by examiner

DEVICE, SYSTEM AND METHOD OF DETERMINING WHETHER A MOBILE DEVICE IS LOCATED IN AN INDOOR LOCATION OR AN OUTDOOR LOCATION

CROSS REFERENCE

This application is a National Phase Application of PCT International Application No. PCT/US2013/043221, International Filing Date May 30, 2013, the entire disclosure of which is incorporated herein by reference.

TECHNICAL FIELD

Embodiments described herein generally relate to determining whether a mobile device is located in an indoor location or an outdoor location.

BACKGROUND

The Federal Communication Commission (FCC) regulates the use of unlicensed frequency bands and sets rules for operation of devices utilizing the unlicensed frequency bands for an indoor and an outdoor use.

The Unlicensed National Information Infrastructure (UNII) frequency band is part of the unlicensed frequency bands.

According to the FCC regulations, a range of channels of 5150-5250 MegaHertz (MHz) of the UNII (UNII1) are only available for an indoor use.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
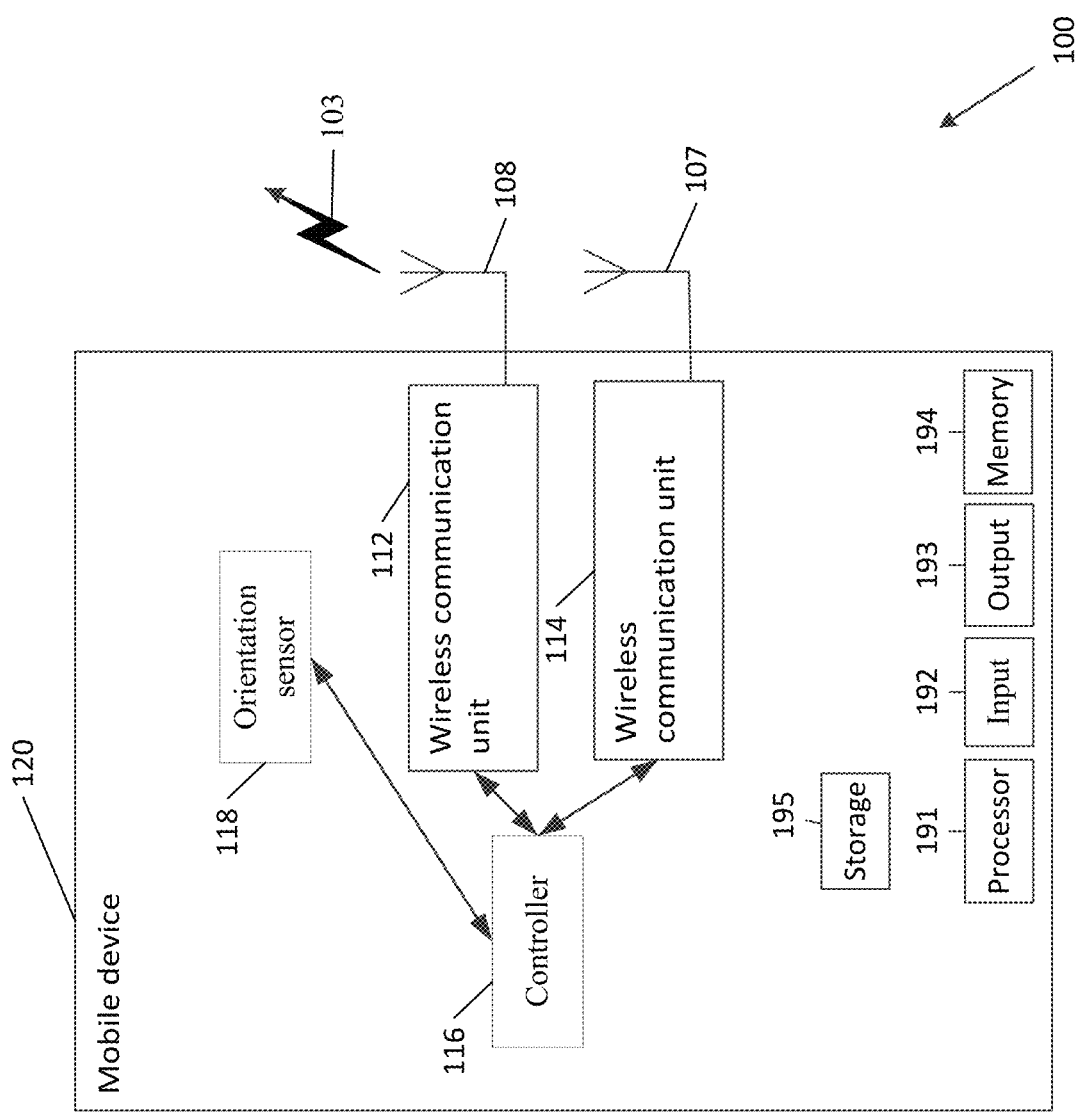
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a mobile computer, a laptop computer, a notebook computer, a tablet computer, an Ultrabook™ computer, a handheld computer, a handheld device, a Personal Digital Assistant (PDA) device, a handheld PDA device, an on-board device, an off-board device, a hybrid device, a vehicular device, a mobile or portable device, a consumer device, a wireless communication station, a wireless communication device, a video device, an audio device, an audio-video (A/V) device, a wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Con-* trol (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include a mobile device 110. The wireless medium may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, device 110 may be configured to communicate over two wireless communication frequency bands. For example, device 110 may communicate over a first frequency band and over a second frequency band, e.g., different from the first frequency band.

In some demonstrative embodiments, the first and second frequency bands may include unlicensed frequency bands, for example, unlicensed frequency bands defined according to the Federal Communication Commission (FCC) regulations, or any other frequency bands.

In some demonstrative embodiments, the first frequency band may include an unlicensed frequency band to be utilized in an indoor location and in an outdoor location, e.g., according to the FCC regulations. For example, the first frequency band may include a 2.4 GigaHertz (GHZ) Industrial, Scientific And Medical (ISM) frequency band.

In some demonstrative embodiments, the second frequency band may include an unlicensed frequency band to be utilized only in the indoor location, e.g., according to the FCC regulations. For example, the second frequency band may include Unlicensed National Information Infrastructure (UNII) frequency band operating at a range of channels of 5150-5250 MHz (UNII1).

In some demonstrative embodiments, the first and second frequency bands may include any other, e.g., licensed or unlicensed, frequency bands according to any other regulations and/or rules.

In some demonstrative embodiments, device 110 may include one or more wireless communication units to perform wireless communication over the first and second wireless communication frequency bands.

For example, device 110 may include a first wireless communication unit 112 configured to communicate over the 2.4 GHz frequency band, and a second wireless communication unit 114 configured to communicate over the UNII1 frequency band.

In some demonstrative embodiments, wireless communication units 112 and/or 114 may include one or more radios, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 112 and/or 114 may include or may be implemented as part of a wireless Network Interface Card (NIC), and the like.

In other embodiments, wireless communication unit 110 may include a multiband transceiver configured to communicate over both the first and the second frequency bands.

In some demonstrative embodiments, mobile device 110 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, wireless communication units 112 and 114 may include, or may be associated with, one or more antennas. In one example, wireless communicate unit 112 may be associated with one or more antennas 108 and wireless communicate unit 114 may be associated with one or more antennas 107.

Antennas 108 and/or 107 may include any type of antennas suitable for transmitting and/or receiving wireless communication signals, blocks, frames, transmission streams, packets, messages and/or data. For example, antennas 108 and/or 107 may include any suitable configuration, structure and/or arrangement of one or more antenna elements, components, units, assemblies and/or arrays. Antennas 108 and/or 107 may include, for example, antennas suitable for directional communication, e.g., using beamforming techniques. For example, antennas 108 and/or 107 may include a phased array antenna, a multiple element antenna, a set of switched beam antennas, and/or the like. In some embodiments, antennas 108 and/or 107 may implement transmit and receive functionalities using separate transmit and receive antenna elements. In some embodiments, antennas 108 and/or 107 may implement transmit and receive functionalities using common and/or integrated transmit/receive elements.

In some demonstrative embodiments, antennas 108 may be suitable for communication over the 2.4 GHz frequency band.

In some demonstrative embodiments, antennas 107 may be suitable for communication over the UNII1 frequency band.

In some demonstrative embodiments, mobile device 110 may also include, for example, a processor 191, an input unit 192, an output unit 193, a memory unit 194, and a storage unit 195. Mobile device 110 may optionally include other suitable hardware components and/or software components. In some demonstrative embodiments, some or all of the components of mobile device 110 may be enclosed in a common housing or packaging, and may be interconnected or operably associated using one or more wired or wireless links. In other embodiments, components of mobile device 110 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 110 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 110.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, mobile device 110 may not be allowed to communicate over the UNII1 frequency band if mobile device 110 is located in an outdoor location, e.g., according to the FCC regulations.

In some demonstrative embodiments, mobile device 110 may be allowed to communicate over the UNII1 frequency band only if mobile device 110 is located in an indoor location, e.g., according to the FCC regulations.

In some demonstrative embodiments, mobile device 110 may include a controller 116 to determine whether device 110 is located in an indoor location or an outdoor location, e.g., as described below.

In some demonstrative embodiments, controller 116 may allow wireless communication unit 114 to communicate over the UNII1 frequency band based on the determination whether device 110 is located in an indoor location or an outdoor location.

In one example, controller 116 may allow wireless communication unit 114 to communicate over the UNII1 frequency band, only if controller 116 determines that device 102 is located in the indoor location.

In another example, controller 116 may disable wireless communication unit 114 from communicating over the UNII1 frequency band, if controller 116 determines that device 102 is located in the outdoor location.

In some demonstrative embodiments, controller 116 may utilize the first frequency band to determine whether to enable or to disable communication over the second frequency band.

In some demonstrative embodiments, controller 116 may utilize a wireless transmission over the first frequency band to determine whether to enable or to disable communication over the second frequency band.

In some demonstrative embodiments, controller 116 may utilize a wireless transmission over the first frequency band to determine whether device 110 is located in the indoor location or the outdoor location, e.g., as described below.

In some demonstrative embodiments, controller 116 may control wireless communication unit 112 to transmit a wireless transmission 103 and to listen for one or more received echoes of wireless transmission 103 received from one or more directions. Controller 116 may determine whether mobile device 110 is located in an indoor location or an outdoor location based on the received echoes, e.g., as described in detail below.

In some demonstrative embodiments, wireless transmission 103 may include a wireless transmission over the 2.4 GHZ frequency band.

In some demonstrative embodiments, wireless transmission 103 may include a wireless transmission performed over one of a three channels of the 2.4 GHz band, e.g., a first channel centered around a frequency of 2412 MHz, a sixth channel centered around a frequency of 2437 MHz, and an eleventh channel centered around a frequency of 2462 MHz. In other embodiments, wireless transmission 103 may include a wireless transmission performed over any other channel of the 2.4 GHz band, e.g., a second channel centered around a frequency of 2417 MHz, or any other channel.

In some demonstrative embodiments, controller 116 may control wireless communication unit 112 to listen for the one or more received echoes of wireless transmission 103 received from the one or more directions.

In some demonstrative embodiments, wireless communication unit 112 may receive the echoes of wireless transmission 103 via antennas 108.

In some demonstrative embodiments, wireless communication unit 112 may listen for the one or more received echoes of wireless transmission 103 at a channel, which was utilized to transmit wireless transmission 103. In one example, wireless communication unit 112 may listen for the one or more received echoes in the first channel of the 2.4 GHz frequency band, for example, if wireless communication unit 112 transmitted wireless transmission 103 in the first channel of the 2.4 GHz frequency band. In another example, wireless communication unit 112 may listen for the one or more received echoes in the eleventh channel of the 2.4 GHz frequency band, for example, if wireless communication unit 112 transmitted wireless transmission 103 in the eleventh channel of the 2.4 GHz frequency band.

In some demonstrative embodiments, wireless communication unit 112 may listen at a receive mode for the one or more received echoes. For example, wireless transmission 103 may include a packet, and wireless communication unit 112 may sense the WM to detect a beginning of a detected packet, e.g., a preamble of the detected packet including a short training sequence.

In some demonstrative embodiments, wireless communication unit 112 may receive the beginning of the detected packet, the remaining of the preamble and the payload of the detected packet, e.g., after detecting the short training sequence.

In some demonstrative embodiments, wireless communication unit 112 may decode the detected packet to determine whether or not the detected packet is an echo of the packet of wireless transmission 103, e.g., by comparing the detected packet to the packet of wireless transmission 103.

In some demonstrative embodiments, controller 116 may determine an echo time period between the transmission of wireless transmission 103 and the receiving of the echoes of wireless transmission 103.

In some demonstrative embodiments, controller 116 may store a first time stamp, for example, when transmitting wireless transmission 103. For example, controller 116 may store a time of a clock of mobile device 110 in memory 194.

In some demonstrative embodiments, controller 116 may store a second time stamp, for example, when receiving the packet.

In some demonstrative embodiments, controller 116 may determine the echo time period based on the difference between the first time stamp and the second time stamp.

In some demonstrative embodiments, wireless communication unit 112 may listen for the received echoes for a predefined time period ("the listening time period"), e.g., from transmitting wireless transmission 103.

In some demonstrative embodiments, controller 116 may compare the echo time period to the listening time period, e.g., to determine whether or not the receiving of the echoes is within the predefined listening time period.

In some demonstrative embodiments, the predefined listening time period may have a duration of at least 600 nanoseconds (ns). In other embodiments, wireless communication unit 112 may listen for the received echoes for any other predefined period of time, e.g., 300 ns, 900 ns, 1200 ns, and the like.

In some demonstrative embodiments, wireless transmission 103 may propagate in space at substantially the speed of light. Accordingly, wireless transmission 103 may travel a distance of 1 foot within 1 ns.

In one example, wireless communication unit 112 may be able to receive echoes of wireless transmission 103 reflected from one or more objects, e.g., walls, buildings, ceilings, and the like, which are located within a distance of 300 feet from device 110, for example, if the predefined listening time period is set to 600 ns.

In another example, wireless communication unit 112 may be able to receive echoes of wireless transmission 103 reflected from one or more objects, which are located within a distance of 600 feet from device 110, for example, if the predefined listening time period is set to 1200 ns.

In some demonstrative embodiments, the one or more directions, from which the echoes are received, e.g., via antennas 108, may include a forward direction with respect to device 110, a backward direction with respect to device 110, a right direction with respect to device 110, a left direction with respect to device 110, an up direction, and/or a ground direction, e.g., as described below with reference to FIG. 3. In other embodiments, the one or more directions may include any other additional of alternative directions.

In some demonstrative embodiments, wireless transmission 103 may include a Radio Frequency (RF) ping frame.

In some demonstrative embodiments, wireless transmission 103 may include a frame configured to maintain the WM for the predefined listening time period without interference from one or more other wireless communication devices.

In some demonstrative embodiments, wireless transmission 103 may include a Clear To Send (CTS) frame.

In some demonstrative embodiments, wireless transmission 103 may include a CTS-to-Self frame, for example, to maintain the WM, e.g., as described below with reference to FIG. 2.

In some demonstrative embodiments, the CTS frame may include a receiver address field.

In some demonstrative embodiments, the receiver address field may include a Media Access Control (MAC) address of device 110, e.g., if wireless transmission 103 includes the CTS-to-Self frame.

Figure 2:
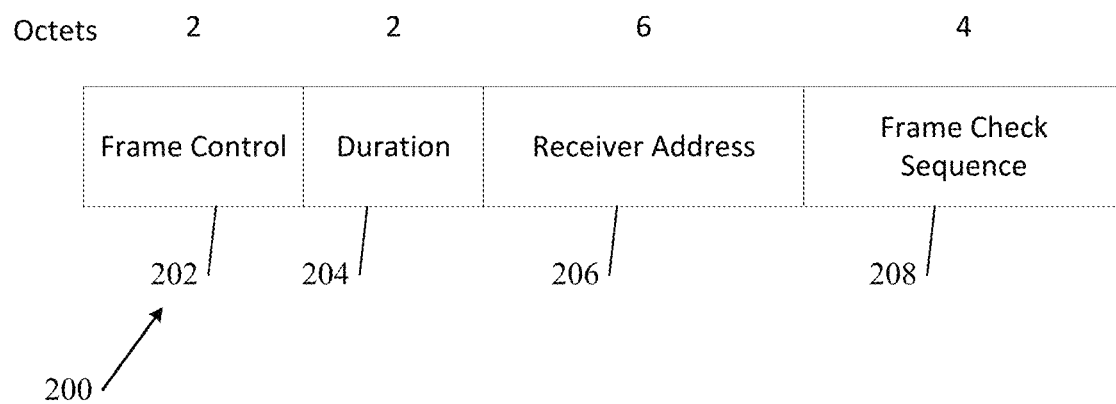
FIG. 2 is a schematic illustration of a Clear-to-Send (CTS) frame structure, in accordance with some demonstrative embodiments.

Reference is made to FIG. 2, which schematically illustrates a CTS-to-Self frame structure 200, in accordance with some demonstrative embodiments. For example, device 110 (FIG. 1) may transmit wireless transmission 103 (FIG. 1) having CTS frame structure 200.

As shown in FIG. 2, CTS frame structure 200 may include a Frame control field 202, a duration field 204, a receiver address field 206 and a Frame check sequence field 208.

In some demonstrative embodiments, receiver address field 206 may include the MAC address of device 110 (FIG. 1).

In some demonstrative embodiments, duration field 204 may include a predefined duration in which device 110 (FIG. 1) may maintain the WM without any interference.

In some demonstrative embodiments, duration field 204 may include a value corresponding to the predefined listening time period, during which wireless communication unit 112 (FIG. 1) is to listen for echoes of transmitted frame 200. For example, duration field may include a value indicating a duration of at least 600 ns.

In one example, transmitting wireless transmission 103 (FIG. 1) including the CTS-to-Self frame may enable device 110 (FIG. 1) to listen and/or to receive echoes of wireless transmission 103 (FIG. 1), e.g., without interference from other wireless communication devices during the duration specified in duration field 204. For example, duration field 240 may request the other wireless communication devices to avoid transmissions during a period of 600 ns after receiving the CTS-to-Self frame.

Figure 3:
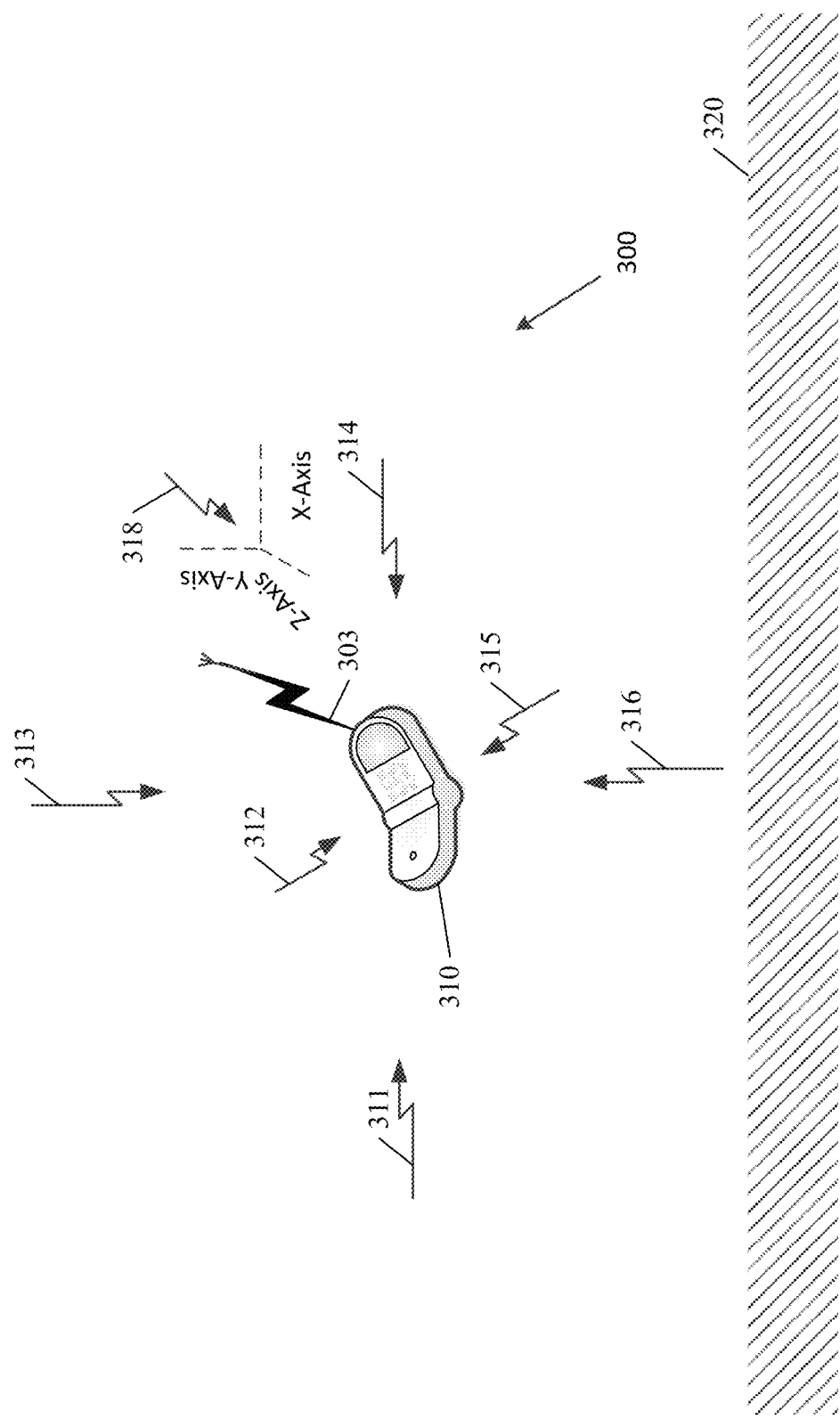
FIG. 3 is a schematic illustration of a mobile device in a three-dimensional (3D) space, in accordance with some demonstrative embodiments.

Reference is made to FIG. 3, which schematically illustrates a mobile device 310 in a three dimensional (3D) space 300, in accordance with some demonstrative embodiments. For example, device 310 may perform the functionality of device 110 (FIG. 1).

As shown in FIG. 3, device 300 may transmit a wireless transmission 303. For example, wireless transmission 303 may include wireless transmission 103 (FIG. 1).

In some demonstrative embodiments, one or more echoes of wireless transmission 303 may be received by device 310 from one or more directions. For example, the one or more echoes may be reflected from one or more objects, e.g., the ground, walls, buildings, obstacles and the like.

In some demonstrative embodiments, device 310 may determine a direction of the one or more directions to include one of a set of 6 directions, e.g., a ground direction, an up direction, a right direction, a left direction, a forward direction and a backward direction.

In one example, controller 116 (FIG. 1) may determine the directions from which the one or more echoes are received. In another example, controller 116 (FIG. 1) may determine the directions based on information received, for example, from an RF chain circuitry of antennas 108.

In one example, controller 116 (FIG. 1) may determine the directions from which the one or more echoes are received based on a steering directionality of antennas 108 (FIG. 1). For example, controller 116 (FIG. 1) may determine an echo is received from the up direction, e.g., if the echo is received by antennas 108 (FIG. 1), e.g., when antennas 108 (FIG. 1) are steered to the up direction. For example, antennas 108 (FIG. 1) may be steered to a plurality of directions, e.g., including the ground direction, the up direction, the right direction, the left direction, the forward direction and/or the backward direction. Controller 116 (FIG. 1) may determine the directions from which the one or more echoes are received according to the directionality of antennas 108 (FIG. 1) when the echo is received.

In some demonstrative embodiments, device 310 may steer antennas 108 (FIG. 1) to a plurality of directions for transmitting a sequence of wireless transmissions directed in different directions, e.g., including the ground direction, the up direction, the right direction, the left direction, the forward direction and/or the backward direction.

In some demonstrative embodiments, device 310 may wait to receive an echo of a transmission, e.g., after the transmission in each of the directions. For example, device 310 may steer antennas 108 (FIG. 1) to a first direction, e.g., the up direction, transmit a wireless transmission, e.g., transmission 103 (FIG. 1) in the first direction, and wait to receive an echo of the first transmission at the first direction. Device 310 may repeat the steering, transmitting and waiting for one or more other directions, e.g., the ground direction, the right direction, the left direction, the forward direction and/or the backward direction.

In other embodiments, device 310 may transmit wireless transmission 103 (FIG. 1) in the form of an omni-directional transmission, and may listen for a received echo from one or more of the directions.

As shown in FIG. 3, a received echo 316 of wireless transmission 303 may be received from the ground direction, e.g., a reflection of wireless transmission 303 from the ground 320; a received echo 313 of wireless transmission 303 may be received from an up direction, e.g., a reflection of wireless transmission 303 from a ceiling and/or the like; a received echo 314 of wireless transmission 303 may be received from a forward direction, e.g., a reflection of wireless transmission 303 from a wall and/or the like, located in front of device 310; a received echo 311 of wireless transmission 303 may be received from a backward direction, e.g., a reflection of wireless transmission 303 from a wall and/or the like located in back of device 310; a received echo 312 of wireless transmission 303 may be received from a left direction, e.g., a reflection of wireless transmission 303 from a wall and/or the like located on a left side of device 310; and/or a received echo 315 of wireless transmission 303 may be received from a right direction, e.g., a reflection of wireless transmission 303 from a wall and/or the like located on a right side of device 310.

In other embodiments, device 310 may utilize any other directions having a relatively greater accuracy, e.g., a direction including an azimuth angle and/or an elevation angle with respect to device 310 in 3D space 300.

For example, device 310 may determine a direction to a received echo 318 by determining an elevation angle and an azimuth angle of echo 318 with respect to device 310.

In some demonstrative embodiments, device 310 may steer antennas 108 (FIG. 1) to form a relatively narrow beam directed in an azimuth angle and an elevation angle. The narrow beam may be used for transmitting wireless transmission 103 (FIG. 1) and/or for receiving the echo of wireless transmission 103 (FIG. 1), e.g., as described above.

Refereeing back to FIG. 1, in some demonstrative embodiments, controller 116 may determine a direction of a received echo of wireless transmission 103 based on an orientation of device 110.

In some demonstrative embodiments, controller 116 may determine an orientation of device 110 based on an orientation measured by an orientation sensor 118 of device 110.

In some demonstrative embodiments, orientation sensor 118 may include a gyroscope, a compass, an accelerometer and/or any other device suitable for measuring an orientation of device 110.

In some demonstrative embodiments, controller 116 may determine an orientation of antennas 108 based on an orientation of device 110. In one example, antennas 108 may have the same orientation of device 110, for example, if antennas 108 are parallel to device 110. In another example, antennas 108 may have different orientation with respect to device 110. For example, if antennas 108 are perpendicular to device 110, a horizontal orientation of device 110 may result in vertical orientation of antennas 108.

In some demonstrative embodiments, antennas 108 may receive an echo of wireless transmission 103.

In some demonstrative embodiments, controller 116 may determine the directionality of the received echo with respect to device 110 based on the orientation of antennas 108.

In one example, controller 116 may determine the directionality of the received echo to be the directionality with respect to antennas 108, for example, if antennas 108 are parallel to device 110.

In another example, controller 116 may determine the directionality of the received echo to be different from the directionality with respect to antennas 108, e.g., if antennas 108 are perpendicular to device 110. For example, controller 116 may determine a directionality of a received echo to be from the right direction, e.g., if the echo is received from a forward direction with respect to antennas 108, and antennas 108 are perpendicular to device 110.

In some demonstrative embodiments, wireless communication unit 112 may receive the received echoes from the one or more directions. Controller 116 may determine for each directions of the directions a signal strength of the received echo of wireless transmission 103, e.g., as follows:

TABLE 1

| Direction | Received Echo Signal Strength (dBm) (0 if no echo is received) |
|---|---|
| Forward | |
| Backward | |
| Left | |
| Right | |
| ... | |
| Up | |
| Ground | |

Although Table 1 indicates six directions, other embodiments may indicate any other number of directions, for example, a number of directions greater than six, e.g., twelve directions, or lesser than six, e.g., four directions.

In some demonstrative embodiments, controller 116 may determine whether device 110 is located in the indoor location or the outdoor location based on the directionality of the received echoes.

In some demonstrative embodiments, controller 116 may determine that device 110 is located in an outdoor location, for example, if device 110 receives echoes of wireless transmission 103 only from the ground direction, e.g., if all the signal strength values in Table 1 except for the ground direction value are null, e.g., zero or close to zero.

For example, controller 116 may determine that device 110 is located in an outdoor location, e.g., if device 110 receives only echo 316 (FIG. 3). In one example, device 110 may receive only echo 316 (FIG. 3), for example, if there are no objects located within a distance of 300 feet from device 110.

In some demonstrative embodiments, controller 116 may determine that device 110 is located in an indoor location, e.g., if device 110 receives echoes of wireless transmission 103 from the ground direction and from at least one other direction of the directions, e.g., at least one signal strength value in a direction other than the ground direction in Table 1 is greater than zero.

For example, controller 116 may determine that device 110 is located in an indoor location, e.g., if device 110 receives at least one of echoes 311, 312, 313, 314, and/or 315 (FIG. 3), e.g., in addition to echo 316 (FIG. 3).

In one example, device 110 may receive echo 316 and echo 313 (FIG. 3), for example, if device 110 is located under a ceiling.

In another example, device 110 may receive echo 316 and echo 314 (FIG. 3), for example, if device 110 is located in front of a wall.

In some demonstrative embodiments, controller 116 may determine that device 110 is located in an indoor location, for example, if device 110 receives echoes of wireless transmission 103 from the ground direction, the up direction and from at least three other directions of the directions, e.g., if Table 1 includes a signal strength value greater than zero at the up direction and at the ground direction and three other signal strength values, which are greater than zero.

For example, controller 116 may determine that device 110 is located in an indoor location if device 110 receives echoes 316 and 313 (FIG. 3) and at least three of echoes 311, 312, 313, 314, and/or 315 (FIG. 3).

In one example, device 110 may receive echoes 316, 313, 312, 314 and 315 for example, if device 110 is located within a room having a ceiling and three walls in three directions, whereas the fourth direction includes a window, an open space, an opening to a hallway and/or the like.

In some demonstrative embodiments, controller 116 may utilize any other combination of the directionalities and/or the signal strength of the received echoes to determine whether device 110 is located in the indoor location or the outdoor location.

In some demonstrative embodiments, controller 116 may repeat the determination of whether device 110 is located in the indoor location or the outdoor location upon a movement of device 110. For example, device 110 may include a Global Positioning System (GPS), an accelerometer and/or the like to detect movement of device 110.

In other embodiments, controller 116 may determine whether device 110 is located in the indoor location or the outdoor location periodically.

In some demonstrative embodiments, determining whether device 110 is located in the indoor location or the outdoor location may enable wireless communication unit 114 to communicate over the UNII1 frequency band according to the FCC regulations. In other embodiments, determining whether device 110 is located in the indoor location or the outdoor location may enable wireless communication unit 114 to communicate over any other frequency band suitable only for an indoor use according to any other rules or regulations.

In one example, controller 116 may enable wireless communication unit 114 to communicate over the second frequency band, if controller 116 determines that device 110 is located in the indoor location.

Figure 4:
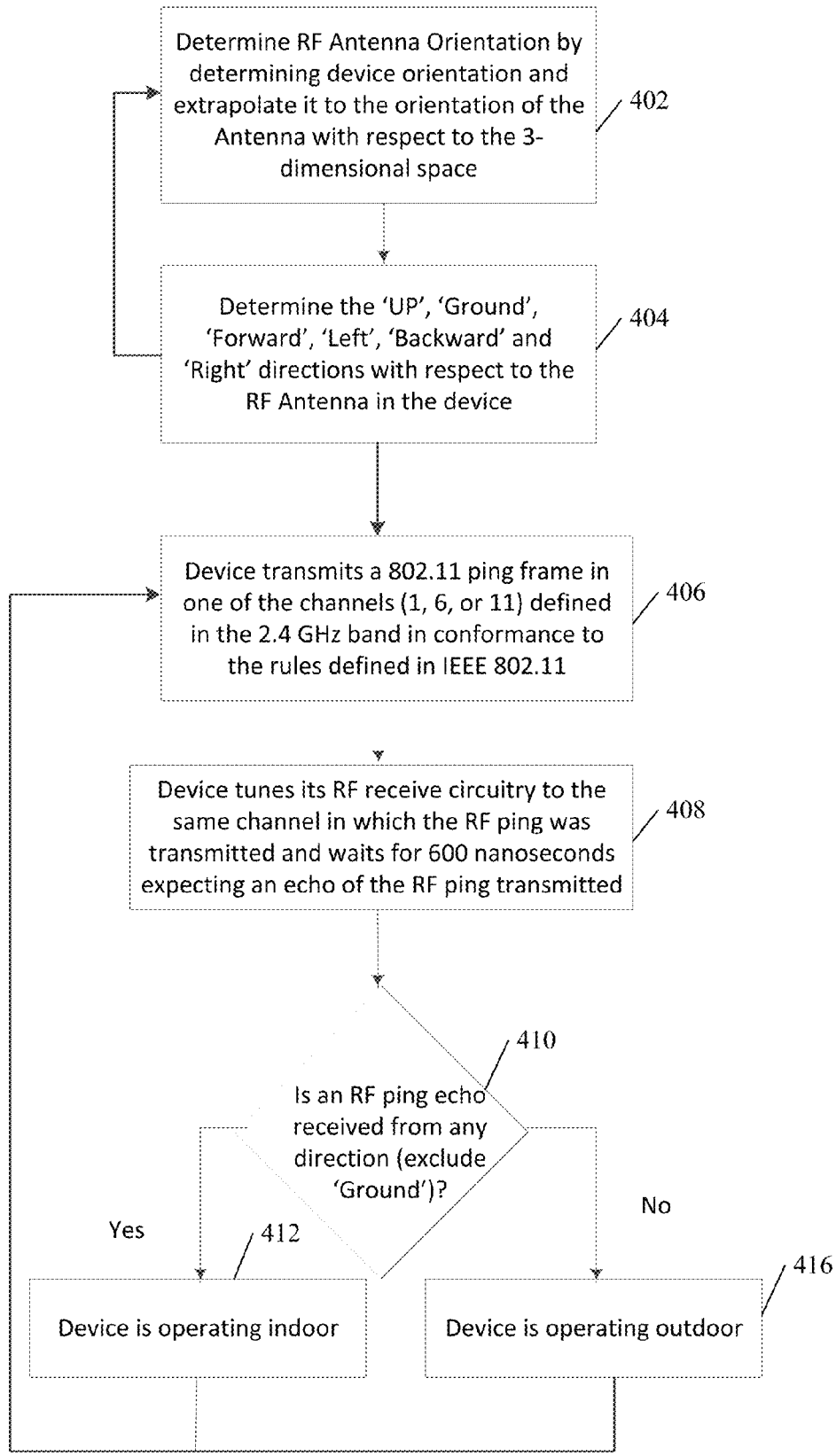
FIG. 4 is a schematic illustration of a method of determining whether a mobile device is located in an indoor location or an outdoor location, in accordance with some demonstrative embodiments.

Reference is made to FIG. 4, which schematically illustrates a method of determining whether a mobile device is located in an indoor location or an outdoor location. In some demonstrative embodiments, one or more of the operations of the method of FIG. 4 may be performed by any suitable wireless communication system, e.g., system 100 (FIG. 1), wireless communication device, e.g., device 110 (FIG. 1), a wireless communication unit, e.g., wireless communication units 112 and/or 114 (FIG. 1) and/or a controller, e.g., controller 116 (FIG. 1).

As indicated at block 402, the method may include determining an antenna orientation by determining a mobile device orientation and extrapolating the orientation of the mobile device to the orientation of the antenna with respect to the 3D space. For example, controller 116 (FIG. 1) may determine the orientation of antennas 108 based on the orientation of device 110 (FIG. 1), e.g., as described above.

As indicated at block 404, the method may include determining directions including the 'UP', 'Ground', 'Forward', 'Left', 'Backward' and 'Right' directions with respect to the antenna of the device. For example, controller 116 (FIG. 1) may determine the 'UP', 'Ground', 'Forward', 'left', 'Backward' and 'Right' directions with respect to antennas 108 (FIG. 1), e.g., as described above.

As indicated at block 406, the method may include transmitting a wireless transmission over the 2.4 GHZ frequency band at a predefined channel. For example, wireless communication unit 112 may transmit wireless transmission 103 (FIG. 1) at the first channel of the 2.4 GHZ frequency band, e.g., as described above.

As indicated at block 408, the method may include waiting for a predefined time period at the predefined channel to receive one or more echoes of the wireless transmission. For example, wireless communication unit 112 may wait for the predefined time period at the first channel of the 2.4 GHZ frequency band to receive one or more echoes of wireless transmission 103 (FIG. 1), e.g., as described above.

As indicated at block 410, the method may include determining whether or not an echo is received from any direction of the directions other than the ground direction. For example, controller 116 may determine whether or not one of echoes 311, 312, 313, 314 and/or 315 (FIG. 3) is received, e.g., as described above.

As indicated at block 412, the method may include determining the device is operating in an indoor location, for example, if an echo is received from any direction of the directions other than the ground direction. For example, controller 116 may determine that device 110 (FIG. 1) is operating in the indoor location if at least one of echoes 311, 312, 313, 314 and/or 315 (FIG. 3) is received, e.g., as described above.

As indicated at block 414, the method may include determining the device is operating in an outdoor location, for example, if no echo is received from any direction of the directions other than the ground direction. For example, controller 116 may determine that device 110 (FIG. 1) is operating in the outdoor location if none of echoes 311, 312, 313, 314 and/or 315 (FIG. 3) is received, e.g., as described above.

Figure 5:
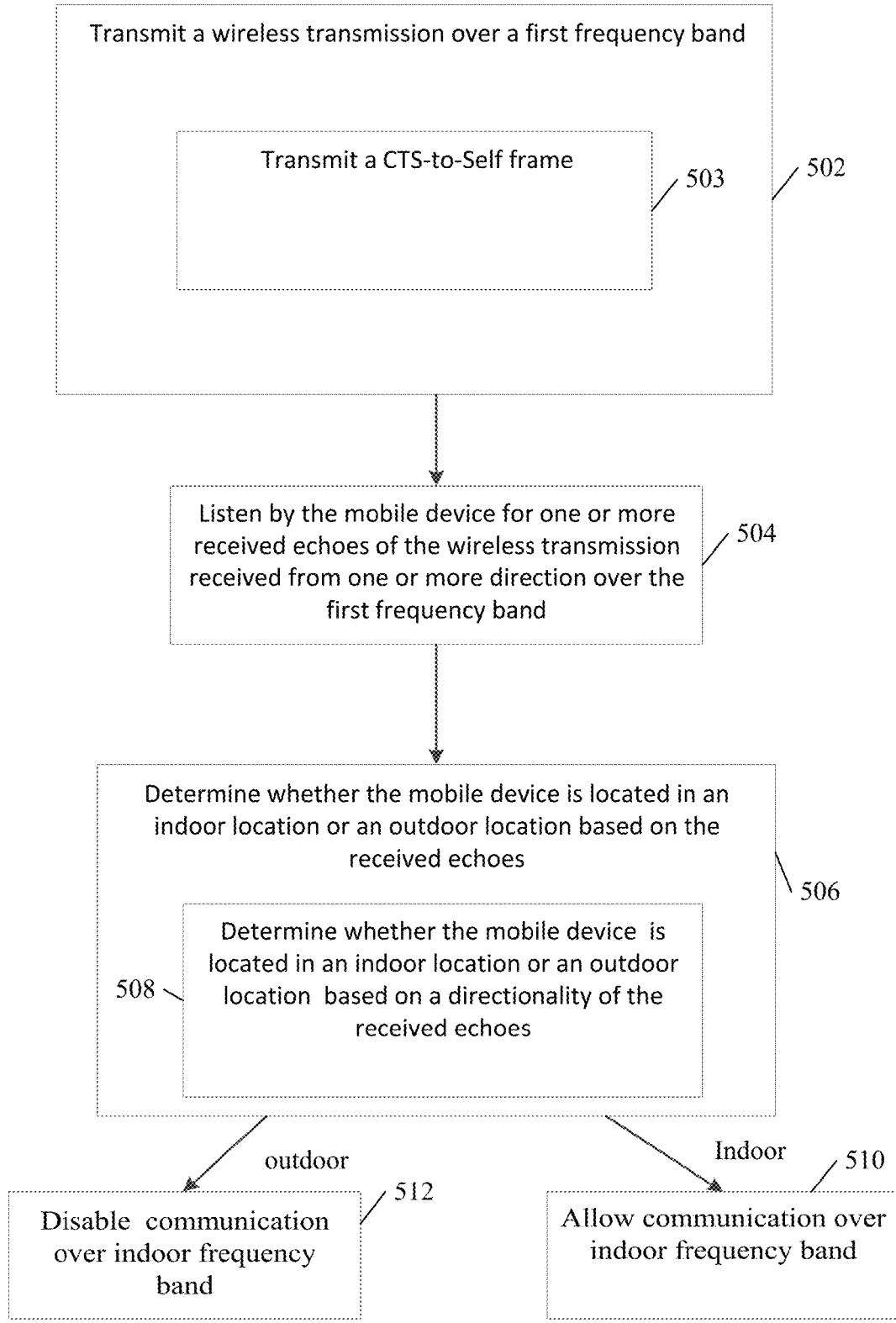
FIG. 5 is a schematic illustration of a method of determining whether a mobile device is located in an indoor location or an outdoor location, in accordance with some demonstrative embodiments.

Reference is made to FIG. 5, which schematically illustrates a method of determining whether a mobile device is located in an indoor location or an outdoor location. In some demonstrative embodiments, one or more of the operations of the method of FIG. 5 may be performed by any suitable wireless communication system, e.g., system 100 (FIG. 1), wireless communication device, e.g., device 110 (FIG. 1), a wireless communication unit, e.g., wireless communication units 112 and/or 114 (FIG. 1) and/or a controller, e.g., controller 116 (FIG. 1).

As indicated at block 502, the method may include transmitting a wireless transmission over a first frequency band. For example, wireless communication unit 112 (FIG. 1) may transmit wireless transmission 103 (FIG. 1), e.g., as described above.

As indicated at block 503, transmitting the wireless transmission may include transmitting a CTS-to-Self frame over the first frequency band. For example, wireless communication unit 112 (FIG. 1) may transmit wireless transmission 103 (FIG. 1) including CTS frame 200 (FIG. 2), e.g., as described above.

As indicated at block 504, the method may include listening by the mobile device for one or more received echoes of the wireless transmission received from one or more directions over the first frequency band. For example, wireless communication unit 112 (FIG. 1) may listen for one or more received echoes of wireless transmission 103 (FIG. 1) received from the one or more directions, e.g., as described above.

As indicated at block 506, the method may include determining whether the mobile device is located in an indoor location or an outdoor location, based on the received echoes. For example, controller 116 (FIG. 1) may determine whether mobile device 110 (FIG. 1) is located in an indoor location or an outdoor location, based on the received echoes of wireless transmission 103 (FIG. 1) received from the one or more directions, e.g., as described above.

As indicated at block 508, determining whether the mobile device is located in an indoor location or an outdoor location based on a directionality of the received echoes of the wireless transmission. For example, controller 116 (FIG. 1) may determine whether mobile device 110 (FIG. 1) is located in an indoor location or an outdoor location based on the directionality of the received echoes of wireless transmission 103 (FIG. 1), e.g., as described above.

In some demonstrative embodiments, the method may include determining whether to enable or disable communication of the mobile device over a second frequency band based on the received echoes.

As indicated at block 510, the method may include allowing communication over the second frequency band, e.g., if it is determined that the mobile device is located in the indoor location. For example, controller 116 (FIG. 1) may allow wireless communication unit 114 (FIG. 1) to communicate over the UNII1 frequency band, e.g., if it is determined that device 110 (FIG. 1) is located in the indoor location, e.g., as described above.

As indicated at block 512, the method may include disabling communication over the second frequency band, e.g., if it is determined that the mobile device is located in the outdoor location. For example, controller 116 (FIG. 1) may disable wireless communication unit 114 (FIG. 1) from communicating over the UNII1 frequency band, e.g., if it is determined that device 110 (FIG. 1) is located in the outdoor location, e.g., as described above.

Figure 6:
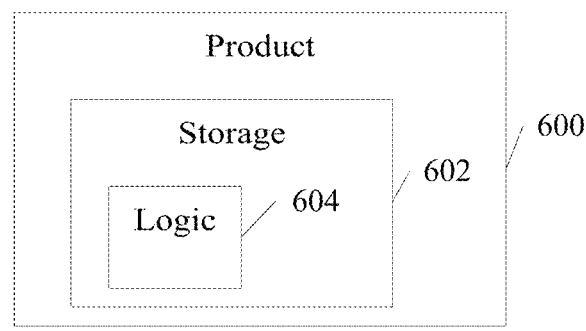
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a non-transitory machine-readable storage medium 602 to store logic 604, which may be used, for example, to perform at least part of the functionality of device 110 (FIG. 1), wireless communication unit 112 (FIG. 1), controller 116 (FIG. 1), and/or to perform one or more operations of the method of FIG. 4 and/or FIG. 5. The phrase "non-transitory machine-readable medium" is directed to include all computer-readable media, with the sole exception being a transitory propagating signal.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a controller to control a mobile device to transmit a wireless transmission and to listen for one or more received echoes of the wireless transmission received from one or more directions, wherein the controller is to determine whether the mobile device is located in an indoor location or an outdoor location based on the received echoes.

Example 2 includes the subject matter of Example 1 and optionally, wherein the controller is to control the mobile device to transmit the wireless transmission over a first frequency band and to listen for the one or more received echoes of the wireless transmission over the first frequency band, and wherein, based on the received echoes, the controller is to enable or disable communication of the mobile device over a second frequency band.

Example 3 includes the subject matter of Example 1 or 2 and optionally, wherein the controller is to determine a direction of the one or more directions based on an orientation of the mobile device.

Example 4 includes the subject matter of Example 3 and optionally, wherein the controller is to determine the direction based on an orientation of an antenna of the mobile device.

Example 5 includes the subject matter of any one of Examples 1-4 and optionally, wherein the controller is to determine whether the mobile device is located in the indoor location or the outdoor location based on a directionality of the received echoes.

Example 6 includes the subject matter of any one of Examples 1-5 and optionally, wherein the one or more directions include at least one direction selected from the group consisting of a forward direction, a backward direction, a right direction, a left direction, an up direction, and a ground direction.

Example 7 includes the subject matter of Example 6 and optionally, wherein the controller is to determine that the mobile device is located in an outdoor location if the received echoes include echoes received only from the ground direction.

Example 8 includes the subject matter of Example 6 or 7 and optionally, wherein the controller is to determine that the mobile device is located in an indoor location if the received echoes include echoes received from the ground direction and from at least one other direction of the directions.

Example 9 includes the subject matter of any one of Examples 6-8 and optionally, wherein the controller is to determine that the mobile device is located in an indoor location if the received echoes include echoes received from the ground direction, the up direction and at least three other directions of the directions.

Example 10 includes the subject matter of any one of Examples 1-9 and optionally, wherein the mobile device is to listen for the one or more received echoes for a predefined time period.

Example 11 includes the subject matter of Example 10 and optionally, wherein the predefined time period has a duration of at least 600 nanoseconds.

Example 12 includes the subject matter of any one of Examples 1-11 and optionally, wherein the wireless transmission comprises a wireless transmission over the 2.4 GHZ frequency band.

Example 13 includes the subject matter of Example 12 and optionally, wherein the wireless transmission comprises a wireless transmission over a channel of the 2.4 GHZ band, and wherein the received echoes comprise received echoes over the channel.

Example 14 includes the subject matter of any one of Examples 1-13 and optionally, wherein the wireless transmission comprises a Radio Frequency (RF) ping frame.

Example 15 includes the subject matter of any one of Examples 1-14 and optionally, wherein the wireless transmission comprises a Clear To Send (CTS) CTS-to-Self frame.

Example 16 includes an apparatus of wireless communication, the apparatus comprising a controller to control a mobile device to transmit a wireless transmission over a first frequency band and to listen for one or more received echoes of the wireless transmission over the first frequency band, wherein the controller is to enable or disable communication of the mobile device over a second frequency band based on the received echoes.

Example 17 includes the subject matter of Example 16 and optionally, wherein the controller is to determine whether the mobile device is located in an indoor location or an outdoor location based on the received echoes.

Example 18 includes the subject matter of Example 17 and optionally, wherein the controller is to enable communication of the mobile device over the second frequency band if the mobile device is located in the indoor location.

Example 19 includes the subject matter of Example 17 or 18 and optionally, wherein the controller is to disable communication of the mobile device over the second frequency band if the mobile device is located in the outdoor location.

Example 20 includes the subject matter of any one of Examples 17-19 and optionally, wherein the controller is to determine whether the mobile device is located in the indoor location or the outdoor location based on a directionality of the received echoes.

Example 21 includes the subject matter of any one of Examples 16-20 and optionally, wherein the received echoes comprise echoes received from one or more directions, and wherein the controller is to determine a direction of the one or more directions based on an orientation of the mobile device.

Example 22 includes the subject matter of Example 21 and optionally, wherein the controller is to determine the direction based on an orientation of an antenna of the mobile device.

Example 23 includes the subject matter of Example 21 or 22 and optionally, wherein the one or more directions include at least one direction selected from the group consisting of a forward direction, a backward direction, a right direction, a left direction, an up direction, and a ground direction.

Example 24 includes the subject matter of Example 23 and optionally, wherein the controller is to disable communication of the mobile device over the second frequency band if the received echoes include echoes received only from the ground direction.

Example 25 includes the subject matter of Example 23 or 24 and optionally, wherein the controller is to enable communication of the mobile device over the second frequency band if the received echoes include echoes received from the ground direction and from at least one other direction of the directions.

Example 26 includes the subject matter of any one of Examples 23-25 and optionally, wherein the controller is to enable communication of the mobile device over the second frequency band if the received echoes include echoes received from the ground direction, the up direction and at least three other directions of the directions.

Example 27 includes the subject matter of any one of Examples 16-26 and optionally, wherein the controller is to control the mobile device to listen for the one or more received echoes over the first frequency band for a predefined time period.

Example 28 includes the subject matter of Example 27 and optionally, wherein the predefined time period has a duration of at least 600 nanoseconds.

Example 29 includes the subject matter of any one of Examples 16-28 and optionally, wherein the wireless transmission comprises a Radio Frequency (RF) ping frame.

Example 30 includes the subject matter of any one of Examples 16-29 and optionally, wherein the wireless transmission comprises a Clear To Send (CTS) CTS-to-Self frame.

Example 31 includes the subject matter of any one of Examples 16-30 and optionally, wherein the first frequency band comprises a 2.4 Gigahertz (GHZ) frequency band, and wherein the second frequency band comprises a 5 GHz frequency band.

Example 32 includes the subject matter of Example 31 and optionally, wherein the second frequency band comprises a range of channels of 5150-5250 Megahertz (MHz).

Example 33 includes the subject matter of any one of Examples 16-32 and optionally, wherein the second frequency band comprises an Unlicensed National Information Infrastructure (UNII) frequency band.

Example 34 includes a method of wireless communication, the method comprising transmitting a wireless transmission; listening for one or more received echoes of the wireless transmission received from one or more directions; and based on the received echoes, determining whether a mobile device is located in an indoor location or an outdoor location.

Example 35 includes the subject matter of Example 34 comprising controlling the mobile device to transmit the wireless transmission over a first frequency band, listening for the one or more received echoes of the wireless transmission over the first frequency band and, based on the received echoes, enabling or disabling communication of the mobile device over a second frequency.

Example 36 includes the subject matter of Example 34 or 35 comprising determining a direction of the one or more directions based on an orientation of the mobile device.

Example 37 includes the subject matter of Example 36 comprising determining the direction based on an orientation of an antenna of the mobile device.

Example 38 includes the subject matter of any one of Examples 34-37 comprising determining whether the mobile device is located in the indoor location or the outdoor location based on a directionality of the received echoes.

Example 39 includes the subject matter of any one of Examples 34-38 and optionally, wherein the one or more directions include at least one direction selected from the group consisting of a forward direction, a backward direction, a right direction, a left direction, an up direction, and a ground direction.

Example 40 includes the subject matter of Example 39 comprising determining that the mobile device is located in an outdoor location if the received echoes include echoes received only from the ground direction.

Example 41 includes the subject matter of Example 39 or 40 comprising determining that the mobile device is located in an indoor location if the received echoes include echoes received from the ground direction and from at least one other direction of the directions.

Example 42 includes the subject matter of any one of Examples 39-41 comprising determining that the mobile device is located in an indoor location if the received echoes include echoes received from the ground direction, the up direction and at least three other directions of the directions.

Example 43 includes the subject matter of any one of Examples 34-42 comprising listening for the one or more received echoes for a predefined time period.

Example 44 includes the subject matter of Example 43 and optionally, wherein the predefined time period has a duration of at least 600 nanoseconds.

Example 45 includes the subject matter of any one of Examples 34-44 and optionally, wherein the wireless transmission comprises a wireless transmission over the 2.4 GHZ frequency band.

Example 46 includes the subject matter of Example 45 and optionally, wherein the wireless transmission comprises a wireless transmission over a channel of the 2.4 GHZ band, and wherein the received echoes comprise received echoes over the channel.

Example 47 includes the subject matter of any one of Examples 34-46 and optionally, wherein the wireless transmission comprises a Radio Frequency (RF) ping frame.

Example 48 includes the subject matter of any one of Examples 34-47 and optionally, wherein the wireless transmission comprises a Clear To Send (CTS) CTS-to-Self frame.

Example 49 includes a method of wireless communication, the method comprising transmitting a wireless transmission over a first frequency band; listening for one or more received echoes of the wireless transmission received from one or more directions over the first frequency band; and based on the received echoes, determining whether to enable or disable communication of a mobile device over a second frequency band.

Example 50 includes the subject matter of Example 49 comprising determining whether the mobile device is located in an indoor location or an outdoor location based on the received echoes.

Example 51 includes the subject matter of Example 50 comprising enabling communication of the mobile device over the second frequency band if the mobile device is located in the indoor location.

Example 52 includes the subject matter of Example 50 or 51 comprising disabling communication of the mobile device over the second frequency band if the mobile device is located in the outdoor location.

Example 53 includes the subject matter of any one of Examples 50-52 comprising determining whether the mobile device is located in the indoor location or the outdoor location based on a directionality of the received echoes.

Example 54 includes the subject matter of any one of Examples 49-53 and optionally, wherein the received echoes comprise echoes received from one or more directions, the method comprising determining a direction of the one or more directions based on an orientation of the mobile device.

Example 55 includes the subject matter of Example 54 comprising determining the direction based on an orientation of an antenna of the mobile device.

Example 56 includes the subject matter of Example 54 or 55 and optionally, wherein the one or more directions include at least one direction selected from the group consisting of a forward direction, a backward direction, a right direction, a left direction, an up direction, and a ground direction.

Example 57 includes the subject matter of Example 56 comprising disabling communication of the mobile device over the second frequency band if the received echoes include echoes received only from the ground direction.

Example 58 includes the subject matter of Example 56 or 57 comprising enabling communication of the mobile device over the second frequency band if the received echoes include echoes received from the ground direction and from at least one other direction of the directions.

Example 59 includes the subject matter of any one of Examples 56-58 comprising enabling communication of the mobile device over the second frequency band if the received echoes include echoes received from the ground direction, the up direction and at least three other directions of the directions.

Example 60 includes the subject matter of any one of Examples 49-59 comprising controlling the mobile device to listen for the one or more received echoes over the first frequency band for a predefined time period.

Example 61 includes the subject matter of Example 60 and optionally, wherein the predefined time period has a duration of at least 600 nanoseconds.

Example 62 includes the subject matter of any one of Examples 49-61 and optionally, wherein the wireless transmission comprises a Radio Frequency (RF) ping frame.

Example 63 includes the subject matter of any one of Examples 49-62 and optionally, wherein the wireless transmission comprises a Clear To Send (CTS) CTS-to-Self frame.

Example 64 includes the subject matter of any one of Examples 49-63 and optionally, wherein the first frequency band comprises a 2.4 Gigahertz (GHZ) frequency band, and wherein the second frequency band comprises a 5 GHz frequency band.

Example 65 includes the subject matter of Example 64 and optionally, wherein the second frequency band comprises a range of channels of 5150-5250 Megahertz (MHz).

Example 66 includes the subject matter of any one of Examples 49-65 and optionally, wherein the second frequency band comprises an Unlicensed National Information Infrastructure (UNII).

Example 67 includes A wireless communication system, the system comprising at least one mobile device including: an antenna to transmit a wireless transmission; a wireless communication unit to transmit the wireless transmission via the antenna and to listen for one or more received echoes of the wireless transmission received from one or more directions; and a controller to determine whether the mobile device is located in an indoor location or an outdoor location based on the received echoes.

Example 68 includes the subject matter of Example 67 and optionally, wherein the controller is to control the mobile device to transmit the wireless transmission over a first frequency band and to listen for the one or more received echoes of the wireless transmission over the first frequency band, and wherein, based on the received echoes, the controller is to enable or disable communication of the mobile device over a second frequency band.

Example 69 includes the subject matter of Example 67 or 68 and optionally, wherein the controller is to determine a direction of the one or more directions based on an orientation of the mobile device.

Example 70 includes the subject matter of Example 69 and optionally, wherein the controller is to determine the direction based on an orientation of the antenna of the mobile device.

Example 71 includes the subject matter of any one of Example 67-70 and optionally, wherein the controller is to determine whether the mobile device is located in the indoor location or the outdoor location based on a directionality of the received echoes.

Example 72 includes the subject matter of any one of Example 67-71 and optionally, wherein the one or more directions include at least one direction selected from the group consisting of a forward direction, a backward direction, a right direction, a left direction, an up direction, and a ground direction.

Example 73 includes the subject matter of Example 72 and optionally, wherein the controller is to determine that the mobile device is located in an outdoor location if the received echoes include echoes received only from the ground direction.

Example 74 includes the subject matter of Example 72 or 73 and optionally, wherein the controller is to determine that the mobile device is located in an indoor location if the received echoes include echoes received from the ground direction and from at least one other direction of the directions.

Example 75 includes the subject matter of any one of Example 72-74 and optionally, wherein the controller is to determine that the mobile device is located in an indoor location if the received echoes include echoes received from the ground direction, the up direction and at least three other directions of the directions.

Example 76 includes the subject matter of any one of Example 67-75 and optionally, wherein the mobile device is to listen for the one or more received echoes for a predefined time period.

Example 77 includes the subject matter of Example 76 and optionally, wherein the predefined time period has a duration of at least 600 nanoseconds.

Example 78 includes the subject matter of any one of Example 67-77 and optionally, wherein the wireless transmission comprises a wireless transmission over the 2.4 GHZ frequency band.

Example 79 includes the subject matter of Example 78 and optionally, wherein the wireless transmission comprises a wireless transmission over a channel of the 2.4 GHZ band, and wherein the received echoes comprise received echoes over the channel.

Example 80 includes the subject matter of any one of Example 67-79 and optionally, wherein the wireless transmission comprises a Radio Frequency (RF) ping frame.

Example 81 includes the subject matter of any one of Example 67-80 and optionally, wherein the wireless transmission comprises a Clear To Send (CTS) CTS-to-Self frame.

Example 82 includes a wireless communication system, the system comprising at least one mobile device including an antenna to transmit a wireless transmission over a first frequency band; a wireless communication unit to transmit the wireless transmission via the antenna and to listen for one or more received echoes of the wireless transmission over the first frequency band; and a controller to determine whether to enable or disable communication of the mobile device over a second frequency band based on the received echoes.

Example 83 includes the subject matter of Example 82 and optionally, wherein the controller is to determine whether the mobile device is located in an indoor location or an outdoor location based on the received echoes.

Example 84 includes the subject matter of Example 83 and optionally, wherein the controller is to enable communication of the mobile device over the second frequency band if the mobile device is located in the indoor location.

Example 85 includes the subject matter of Example 83 or 84 and optionally, wherein the controller is to disable communication of the mobile device over the second frequency band if the mobile device is located in the outdoor location.

Example 86 includes the subject matter of any one of Example 83-85 and optionally, wherein the controller is to determine whether the mobile device is located in the indoor location or the outdoor location based on a directionality of the received echoes.

Example 87 includes the subject matter of any one of Example 82-86 and optionally, wherein the received echoes comprise echoes received from one or more directions, and wherein the controller is to determine a direction of the one or more directions based on an orientation of the mobile device.

Example 88 includes the subject matter of Example 87 and optionally, wherein the controller is to determine the direction based on an orientation of the antenna of the mobile device.

Example 89 includes the subject matter of Example 87 or 88 and optionally, wherein the one or more directions include at least one direction selected from the group consisting of a forward direction, a backward direction, a right direction, a left direction, an up direction, and a ground direction.

Example 90 includes the subject matter of Example 89 and optionally, wherein the controller is to disable communication of the mobile device over the second frequency band if the received echoes include echoes received only from the ground direction.

Example 91 includes the subject matter of Example 89 or 90 and optionally, wherein the controller is to enable communication of the mobile device over the second frequency band if the received echoes include echoes received from the ground direction and from at least one other direction of the directions.

Example 92 includes the subject matter of any one of Example 89-91 and optionally, wherein the controller is to enable communication of the mobile device over the second frequency band if the received echoes include echoes received from the ground direction, the up direction and at least three other directions of the directions.

Example 93 includes the subject matter of any one of Example 82-92 and optionally, wherein the controller is to control the mobile device to listen for the one or more received echoes over the first frequency band for a predefined time period.

Example 94 includes the subject matter of Example 93 and optionally, wherein the predefined time period has a duration of at least 600 nanoseconds.

Example 95 includes the subject matter of any one of Example 82-94 and optionally, wherein the wireless transmission comprises a Radio Frequency (RF) ping frame.

Example 96 includes the subject matter of any one of Example 82-95 and optionally, wherein the wireless transmission comprises a Clear To Send (CTS) CTS-to-Self frame.

Example 97 includes the subject matter of any one of Example 82-96 and optionally, wherein the first frequency band comprises a 2.4 Gigahertz (GHZ) frequency band, and wherein the second frequency band comprises a 5 GHz frequency band.

Example 98 includes the subject matter of Example 97 and optionally, wherein the second frequency band comprises a range of channels of 5150-5250 Megahertz (MHz).

Example 99 includes the subject matter of any one of Example 82-98 and optionally, wherein the second frequency band comprises an Unlicensed National Information Infrastructure (UNII) frequency band.

Example 100 includes a product including a non-transitory storage medium having stored thereon instructions that, when executed by a machine, result in transmitting a wireless transmission; listening for one or more received echoes of the wireless transmission received from one or more directions; and based on the received echoes, determining whether a mobile device is located in an indoor location or an outdoor location.

Example 101 includes the subject matter of Example 100 and optionally, wherein the instructions result in controlling the mobile device to transmit the wireless transmission over a first frequency band, listening for the one or more received echoes of the wireless transmission over the first frequency band and, based on the received echoes, enabling or disabling communication of the mobile device over a second frequency.

Example 102 includes the subject matter of Example 100 or 101 and optionally, wherein the instructions result in determining a direction of the one or more directions based on an orientation of the mobile device.

Example 103 includes the subject matter of Example 102 and optionally, wherein the instructions result in determining the direction based on an orientation of an antenna of the mobile device.

Example 104 includes the subject matter of any one of Example 100-103 and optionally, wherein the instructions result in determining whether the mobile device is located in the indoor location or the outdoor location based on a directionality of the received echoes.

Example 105 includes the subject matter of any one of Example 100-104 and optionally, wherein the one or more directions include at least one direction selected from the group consisting of a forward direction, a backward direction, a right direction, a left direction, an up direction, and a ground direction.

Example 106 includes the subject matter of Example 105 and optionally, wherein the instructions result in determining that the mobile device is located in an outdoor location if the received echoes include echoes received only from the ground direction.

Example 107 includes the subject matter of Example 105 or 106 and optionally, wherein the instructions result in determining that the mobile device is located in an indoor location if the received echoes include echoes received from the ground direction and from at least one other direction of the directions.

Example 108 includes the subject matter of any one of Example 105-107 and optionally, wherein the instructions result in determining that the mobile device is located in an indoor location if the received echoes include echoes received from the ground direction, the up direction and at least three other directions of the directions.

Example 109 includes the subject matter of any one of Example 100-108 and optionally, wherein the instructions result in listening for the one or more received echoes for a predefined time period.

Example 110 includes the subject matter of Example 109 and optionally, wherein the predefined time period has a duration of at least 600 nanoseconds.

Example 111 includes the subject matter of any one of Example 100-110 and optionally, wherein the wireless transmission comprises a wireless transmission over the 2.4 GHZ frequency band.

Example 112 includes the subject matter of Example 111 and optionally, wherein the wireless transmission comprises a wireless transmission over a channel of the 2.4 GHZ band, and wherein the received echoes comprise received echoes over the channel.

Example 113 includes the subject matter of any one of Example 100-112 and optionally, wherein the wireless transmission comprises a Radio Frequency (RF) ping frame.

Example 114 includes the subject matter of any one of Example 100-113 and optionally, wherein the wireless transmission comprises a Clear To Send (CTS) CTS-to-Self frame.

Example 115 includes a product including a non-transitory storage medium having stored thereon instructions that, when executed by a machine, result in transmitting a wireless transmission over a first frequency band; listening for one or more received echoes of the wireless transmission received from one or more directions over the first frequency band; and based on the received echoes, determining whether to enable or disable communication of a mobile device over a second frequency band.

Example 116 includes the subject matter of Example 115 and optionally, wherein the instructions result in determining whether the mobile device is located in an indoor location or an outdoor location based on the received echoes.

Example 117 includes the subject matter of Example 116 and optionally, wherein the instructions result in enabling communication of the mobile device over the second frequency band if the mobile device is located in the indoor location.

Example 118 includes the subject matter of Example 116 or 117 and optionally, wherein the instructions result in disabling communication of the mobile device over the second frequency band if the mobile device is located in the outdoor location.

Example 119 includes the subject matter of any one of Example 116-118 and optionally, wherein the instructions result in determining whether the mobile device is located in the indoor location or the outdoor location based on a directionality of the received echoes.

Example 120 includes the subject matter of any one of Example 115-119 and optionally, wherein the received echoes comprise echoes received from one or more directions, and wherein the instructions result in determining a direction of the one or more directions based on an orientation of the mobile device.

Example 121 includes the subject matter of Example 120 and optionally, wherein the instructions result in determining the direction based on an orientation of an antenna of the mobile device.

Example 122 includes the subject matter of Example 120 or 121 and optionally, wherein the one or more directions include at least one direction selected from the group consisting of a forward direction, a backward direction, a right direction, a left direction, an up direction, and a ground direction.

Example 123 includes the subject matter of Example 122 and optionally, wherein the instructions result in disabling communication of the mobile device over the second frequency band if the received echoes include echoes received only from the ground direction.

Example 124 includes the subject matter of Example 122 or 123 and optionally, wherein the instructions result in enabling communication of the mobile device over the second frequency band if the received echoes include echoes received from the ground direction and from at least one other direction of the directions.

Example 125 includes the subject matter of any one of Example 122-124 and optionally, wherein the instructions result in enabling communication of the mobile device over the second frequency band if the received echoes include echoes received from the ground direction, the up direction and at least three other directions of the directions.

Example 126 includes the subject matter of any one of Example 115-125 and optionally, wherein the instructions result in controlling the mobile device to listen for the one or more received echoes over the first frequency band for a predefined time period.

Example 127 includes the subject matter of Example 126 and optionally, wherein the predefined time period has a duration of at least 600 nanoseconds.

Example 128 includes the subject matter of any one of Example 115-127 and optionally, wherein the wireless transmission comprises a Radio Frequency (RF) ping frame.

Example 129 includes the subject matter of any one of Example 115-128 and optionally, wherein the wireless transmission comprises a Clear To Send (CTS) CTS-to-Self frame.

Example 130 includes the subject matter of any one of Example 115-129 and optionally, wherein the first frequency band comprises a 2.4 Gigahertz (GHZ) frequency band, and wherein the second frequency band comprises a 5 GHz frequency band.

Example 131 includes the subject matter of Example 130 and optionally, wherein the second frequency band comprises a range of channels of 5150-5250 Megahertz (MHz).

Example 132 includes the subject matter of any one of Example 115-131 and optionally, wherein the second frequency band comprises an Unlicensed National Information Infrastructure (UNII) frequency band.

Example 133 includes an apparatus of wireless communication, the apparatus comprising means for transmitting a wireless transmission; means for listening for one or more received echoes of the wireless transmission received from one or more directions; and means for determining whether a mobile device is located in an indoor location or an outdoor location based on the received echoes.

Example 134 includes the subject matter of Example 133 comprising means for controlling the mobile device to transmit the wireless transmission over a first frequency band, listening for the one or more received echoes of the wireless transmission over the first frequency band, and enabling or disabling communication of the mobile device over a second frequency based on the received echoes.

Example 135 includes the subject matter of Example 133 or 134 comprising means for determining a direction of the one or more directions based on an orientation of the mobile device.

Example 136 includes the subject matter of Example 135 comprising means for determining the direction based on an orientation of an antenna of the mobile device.

Example 137 includes the subject matter of any one of Examples 133-136 comprising means for determining whether the mobile device is located in the indoor location or the outdoor location based on a directionality of the received echoes.

Example 138 includes the subject matter of any one of Examples 133-137 and optionally, wherein the one or more directions include at least one direction selected from the group consisting of a forward direction, a backward direction, a right direction, a left direction, an up direction, and a ground direction.

Example 139 includes the subject matter of Example 138 comprising means for determining that the mobile device is located in an outdoor location if the received echoes include echoes received only from the ground direction.

Example 140 includes the subject matter of Example 138 or 139 comprising means for determining that the mobile device is located in an indoor location if the received echoes include echoes received from the ground direction and from at least one other direction of the directions.

Example 141 includes the subject matter of any one of Examples 138-140 comprising means for determining that the mobile device is located in an indoor location if the received echoes include echoes received from the ground direction, the up direction and at least three other directions of the directions.

Example 142 includes the subject matter of any one of Examples 133-141 comprising means for listening for the one or more received echoes for a predefined time period.

Example 143 includes the subject matter of Example 142 and optionally, wherein the predefined time period has a duration of at least 600 nanoseconds.

Example 144 includes the subject matter of any one of Examples 133-143 and optionally, wherein the wireless transmission comprises a wireless transmission over the 2.4 GHZ frequency band.

Example 145 includes the subject matter of Example 144 and optionally, wherein the wireless transmission comprises a wireless transmission over a channel of the 2.4 GHZ band, and wherein the received echoes comprise received echoes over the channel.

Example 146 includes the subject matter of any one of Examples 133-145 and optionally, wherein the wireless transmission comprises a Radio Frequency (RF) ping frame.

Example 147 includes the subject matter of any one of Examples 133-146 and optionally, wherein the wireless transmission comprises a Clear To Send (CTS) CTS-to-Self frame.

Example 148 includes an apparatus of wireless communication, the apparatus comprising means for transmitting a wireless transmission over a first frequency band; means for listening for one or more received echoes of the wireless transmission received from one or more directions over the first frequency band; and means for determining whether to enable or disable communication of a mobile device over a second frequency band based on the received echoes.

Example 149 includes the subject matter of Example 148 comprising means for determining whether the mobile device is located in an indoor location or an outdoor location based on the received echoes.

Example 150 includes the subject matter of Example 149 comprising means for enabling communication of the mobile device over the second frequency band if the mobile device is located in the indoor location.

Example 151 includes the subject matter of Example 149 or 150 comprising means for disabling communication of the mobile device over the second frequency band if the mobile device is located in the outdoor location.

Example 152 includes the subject matter of any one of Examples 149-151 comprising means for determining whether the mobile device is located in the indoor location or the outdoor location based on a directionality of the received echoes.

Example 153 includes the subject matter of any one of Examples 148-152 and optionally, wherein the received echoes comprise echoes received from one or more directions, and wherein the apparatus comprising means for determining a direction of the one or more directions based on an orientation of the mobile device.

Example 154 includes the subject matter of Example 153 comprising means for determining the direction based on an orientation of an antenna of the mobile device.

Example 155 includes the subject matter of Example 153 or 154 and optionally, wherein the one or more directions include at least one direction selected from the group consisting of a forward direction, a backward direction, a right direction, a left direction, an up direction, and a ground direction.

Example 156 includes the subject matter of Example 155 comprising means for disabling communication of the mobile device over the second frequency band if the received echoes include echoes received only from the ground direction.

Example 157 includes the subject matter of Example 155 or 156 comprising means for enabling communication of the mobile device over the second frequency band if the received echoes include echoes received from the ground direction and from at least one other direction of the directions.

Example 158 includes the subject matter of any one of Examples 155-157 comprising means for enabling communication of the mobile device over the second frequency band if the received echoes include echoes received from the ground direction, the up direction and at least three other directions of the directions.

Example 159 includes the subject matter of any one of Examples 148-158 comprising means for controlling the mobile device to listen for the one or more received echoes over the first frequency band for a predefined time period.

Example 160 includes the subject matter of Example 159 and optionally, wherein the predefined time period has a duration of at least 600 nanoseconds.

Example 161 includes the subject matter of any one of Examples 148-160 and optionally, wherein the wireless transmission comprises a Radio Frequency (RF) ping frame.

Example 162 includes the subject matter of any one of Examples 148-161 and optionally, wherein the wireless transmission comprises a Clear To Send (CTS) CTS-to-Self frame.

Example 163 includes the subject matter of any one of Examples 148-162 and optionally, wherein the first frequency band comprises a 2.4 Gigahertz (GHZ) frequency band, and wherein the second frequency band comprises a 5 GHz frequency band.

Example 164 includes the subject matter of Example 163 and optionally, wherein the second frequency band comprises a range of channels of 5150-5250 Megahertz (MHz).

Example 165 includes the subject matter of any one of Examples 148-164 and optionally, wherein the second frequency band comprises an Unlicensed National Information Infrastructure (UNII) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a controller configured to control a mobile device to transmit a wireless transmission and to listen for one or more received echoes of the wireless transmission received from one or more directions, wherein said controller is to determine whether said mobile device is located in an indoor location or an outdoor location based on a directionality of the received echoes, said controller is configured to determine that said mobile device is located in the outdoor location when the received echoes include echoes received only from a ground direction, and to determine that said mobile device is located in the indoor location when the received echoes include echoes received from the ground direction and from at least one other predefined direction.

2. The apparatus of claim 1, wherein said controller is to control said mobile device to transmit said wireless transmission over a first frequency band and to listen for the one or more received echoes of the wireless transmission over the first frequency band, and wherein, based on the received echoes, said controller is to enable or disable communication of said mobile device over a second frequency band.

3. The apparatus of claim 1, wherein said controller is to determine a direction of said one or more directions based on an orientation of the mobile device.

4. The apparatus of claim 3, wherein said controller is to determine said direction based on an orientation of an antenna of the mobile device.

5. The apparatus of claim 1, wherein said one or more directions include at least one direction selected from a group consisting of a forward direction, a backward direction, a right direction, a left direction, an up direction, and the ground direction.

6. The apparatus of claim 1, wherein said controller is to determine that said mobile device is located in the indoor location when the received echoes include echoes received from the ground direction, an up direction and at least three other directions.

7. The apparatus of claim 1, wherein said mobile device is to listen for the one or more received echoes for a predefined time period.

8. The apparatus of claim 7, wherein said predefined time period has a duration of at least 600 nanoseconds.

9. The apparatus of claim 1, wherein said wireless transmission comprises a wireless transmission over the 2.4 GHZ frequency band.

10. The apparatus of claim 9, wherein said wireless transmission comprises a wireless transmission over a channel of the 2.4 GHZ band, and wherein said received echoes comprise received echoes over said channel.

11. The apparatus of claim 1, wherein said wireless transmission comprises a Radio Frequency (RF) ping frame.

12. The apparatus of claim 1, wherein said wireless transmission comprises a Clear To Send (CTS) CTS-to-Self frame.

13. A system comprising:
at least one mobile device including:
an antenna to transmit a wireless transmission over a first frequency band;
a wireless communication unit to transmit the wireless transmission via the antenna and to listen for one or more received echoes of the wireless transmission over the first frequency band; and
a controller configured to determine whether to enable or disable communication of said mobile device over a second frequency band based on a directionality of the received echoes, said controller is configured to disable communication of said mobile device over said second frequency band when the received echoes include echoes received only from a ground direction, and to enable communication of said mobile device over said second frequency band when the received echoes include echoes received from the ground direction and from at least one other predefined direction.

14. The system of claim 13, wherein said controller is to determine whether said mobile device is located in an indoor location or an outdoor location based on the received echoes.

15. The system of claim 13, wherein said received echoes comprise echoes received from one or more directions, and wherein said controller is to determine a direction of said one or more directions based on an orientation of the mobile device.

16. The system of claim 15, wherein said one or more directions include at least one direction selected from a group consisting of a forward direction, a backward direction, a right direction, a left direction, an up direction, and the ground direction.

17. The system of claim 13, wherein said controller is to enable communication of said mobile device over said second frequency band when the received echoes include echoes received from the ground direction, an up direction and at least three other directions.

18. The system of claim 13, wherein said first frequency band comprises a 2.4 Gigahertz (GHZ) frequency band, and wherein said second frequency band comprises a 5 GHz frequency band.

19. The system of claim 13, wherein said second frequency band comprises an Unlicensed National Information Infrastructure (UNIT) frequency band.

20. A method comprising:
transmitting a wireless transmission;
listening for one or more received echoes of the wireless transmission received from one or more directions; and
based on a directionality of the received echoes, determining whether a mobile device is located in an indoor location or an outdoor location, said determining comprises determining that said mobile device is located in the outdoor location when the received echoes include echoes received only from a ground direction, and determining that said mobile device is located in the indoor location when the received echoes include echoes received from the ground direction and from at least one other predefined direction.

21. The method of claim 20 comprising controlling said mobile device to transmit said wireless transmission over a first frequency band, listening for the one or more received echoes of the wireless transmission over the first frequency band and, based on the received echoes, enabling or disabling communication of said mobile device over a second frequency band.

22. A product including a non-transitory storage medium having stored thereon instructions that, when executed by a machine, result in:
transmitting a wireless transmission over a first frequency band;
listening for one or more received echoes of the wireless transmission received from one or more directions over the first frequency band; and
based on a directionality of the received echoes, determining whether to enable or disable communication of a mobile device over a second frequency band, said determining comprises disabling communication of said mobile device over said second frequency band when the received echoes include echoes received only from a ground direction, and enabling communication of said mobile device over said second frequency band when the received echoes include echoes received from the around direction and from at least one other predefined direction.

23. The product of claim 22, wherein said instructions result in determining whether said mobile device is located in an indoor location or an outdoor location based on the received echoes.

24. The product of claim 22, wherein said received echoes comprise echoes received from one or more directions, and wherein said instructions result in determining a direction of said one or more directions based on an orientation of the mobile device.

25. The product of claim 22, wherein said instructions result in controlling said mobile device to listen for the one or more received echoes over the first frequency band for a predefined time period.

* * * * *